(12) United States Patent
Tamagawa et al.

(10) Patent No.: US 7,994,483 B2
(45) Date of Patent: Aug. 9, 2011

(54) GAS ELECTRON MULTIPLIER AND MANUFACTURING METHOD FOR GAS ELECTRON MULTIPLICATION FOIL USED FOR SAME AS WELL AS RADIATION DETECTOR USING GAS ELECTRON MULTIPLIER

(75) Inventors: Toru Tamagawa, Niiza (JP); Satoshi Koshimuta, Sagamihara (JP); Hideki Hamagaki, Nagareyama (JP)

(73) Assignees: Riken, Wako-shi (JP); The University of Tokyo, Tokyo (JP); Scienergy Co., Ltd., Sagamihara-shi (JP)

( * ) Notice: Subject to any disclaimer, the term of this patent is extended or adjusted under 35 U.S.C. 154(b) by 0 days.

(21) Appl. No.: 12/224,228

(22) PCT Filed: Mar. 1, 2007

(86) PCT No.: PCT/JP2007/053875
§ 371 (c)(1),
(2), (4) Date: Sep. 2, 2008

(87) PCT Pub. No.: WO2007/100029
PCT Pub. Date: Sep. 7, 2007

(65) Prior Publication Data
US 2009/0084972 A1    Apr. 2, 2009

(30) Foreign Application Priority Data
Mar. 2, 2006    (JP) .................................. 2006-056997

(51) Int. Cl.
*G01T 1/185*    (2006.01)
*G01T 1/205*    (2006.01)
*H01J 47/00*    (2006.01)

(52) U.S. Cl. ........................................ 250/374; 250/388
(58) Field of Classification Search .................. 250/388, 250/374, 385.1
See application file for complete search history.

(56) References Cited

U.S. PATENT DOCUMENTS
5,742,061 A    4/1998    Lemonnier et al.
(Continued)

FOREIGN PATENT DOCUMENTS
JP    A-9-508750    9/1997
(Continued)

OTHER PUBLICATIONS

Kim et al., "Application of the LIGA Process for Fabrication of Gas Avalanche Devices", *IEEE Transactions on Nuclear Science*, vol. 47, No. 3, Jun. 2000, pp. 923-927.

(Continued)

*Primary Examiner* — David P Porta
*Assistant Examiner* — Jessica L Eley
(74) *Attorney, Agent, or Firm* — Oliff & Berridge, PLC

(57) ABSTRACT

To attain objects to reduce the spread of electrons as compared with a conventional one without degrading the multiplication factor of electrons; to provide a large electron multiplication factor; and to improve positional resolution, there is provided a gas electron multiplier using interaction between radiation and gas through photoelectric effects including: a chamber filled with gas and a single gas electron multiplication foil arranged in the chamber wherein the gas electron multiplication foil is made of a plate-like multilayer body composed by having a plate-like insulation layer made of a macromolecular polymer material having a thickness of around 100 μm to 300 μm and flat metal layers overlaid on both surfaces of the insulation layer, and the plate-like multilayer body is provided with a through-hole structure.

6 Claims, 9 Drawing Sheets

U.S. PATENT DOCUMENTS

| | | | |
|---|---|---|---|
| 6,011,265 A * | 1/2000 | Sauli | 250/374 |
| 6,429,578 B1 * | 8/2002 | Danielsson et al. | 313/105 CM |
| 6,878,944 B1 * | 4/2005 | Gerstenmayer et al. | 250/374 |
| 2002/0139935 A1 * | 10/2002 | Klein et al. | 250/390.01 |

FOREIGN PATENT DOCUMENTS

| | | |
|---|---|---|
| JP | A-2005-032634 | 2/2005 |

OTHER PUBLICATIONS

Sauli, "GEM: A new concept for electron amplification in gas detectors", *Nuclear Instruments and Methods in Physics Research A*, vol. 386, 1997, pp. 531-534.

Office Action mailed Mar. 8, 2011 in Japanese Counterpart Application No. 2006-056997.

* cited by examiner

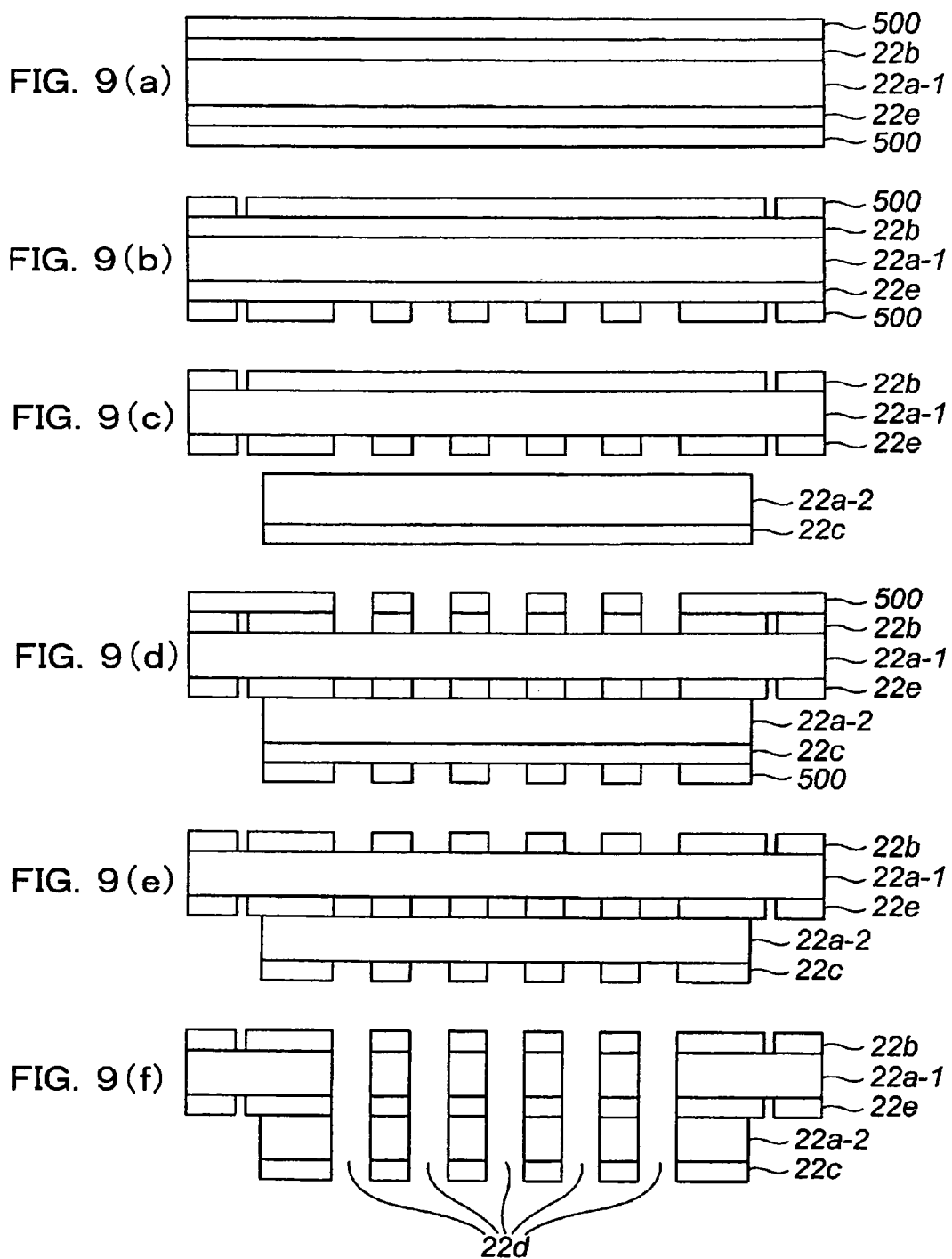

US 7,994,483 B2

1

GAS ELECTRON MULTIPLIER AND MANUFACTURING METHOD FOR GAS ELECTRON MULTIPLICATION FOIL USED FOR SAME AS WELL AS RADIATION DETECTOR USING GAS ELECTRON MULTIPLIER

TECHNICAL FIELD

The present invention relates to a gas electron multiplier and a manufacturing method for a gas electron multiplication foil used for the same as well as a radiation detector using a gas electron multiplier, and in particular, to a gas electron multiplier using the interaction between radiation and gas through the photoelectric effect, and a manufacturing method for a gas electron multiplication foil used for the same as well as a radiation detector using a gas electron multiplier.

BACKGROUND ART

Conventional gas electron multipliers (GEM) have been used to detect radiation, such as charged particles, gamma rays, x-rays, neutrons and ultraviolet rays.

When the radiation, which is the detection target, enters such a gas electron multiplier, it uses electron avalanche effects to multiply photoelectrons released from gas atoms as a result of the interaction between radiation and a gas through photoelectric effects and enables to detect the radiation as an electrical signal.

FIG. 1 is a cross sectional diagram schematically showing a configuration of a radiation detector using a conventional gas electron multiplier.

The radiation detector 100 shown in FIG. 1 is composed of an outer chamber 102 filled with a predetermined gas for detection, and detector elements inside the chamber 102, which are a drift electrode 104 and a collecting electrode 106, and a first gas electron multiplication foil (GEM foil) 108 and a second gas electron multiplication foil 110 placed between the drift electrode 104 and the collecting electrode 106 at a predetermined distance TR.

Here, as the gas for detection to be filled in the chamber 102, mixed gas of rare gas and quencher gas is generally used. For example, the rare gas may be He, Ne, Ar, Xe or the like and the quencher gas may be $CO_2$, $CH_4$, $C_2H_6$, $CF_4$ or the like. In addition, the fraction of the quencher gas mixed with the rare gas is appropriate to be 5% to 30%.

Here, the chamber 102 filled with the predetermined gas for detection, the first gas electron multiplication foil 108 and the second gas electron multiplication foil 110 form a gas electron multiplier. The first gas electron multiplication foil 108 and the second gas electron multiplication foil 110, each of which is made of a plate-like multilayer body having the same configuration, are to provide a function to multiply charge using electron avalanche effects.

In further detail, the first gas electron multiplication foil 108 (the second gas electron multiplication foil 110) is composed of a plate-like insulation layer 108a (110a) made of resin having a thickness t0 of 50 μm, and flat metal layers 108b and 108c (110b and 110c) overlaid on both surfaces of the insulation layer 108a (110a). In addition, a large number of through-holes 108d, 110d are formed for condensing the electrical field in the first gas electron multiplication foil 108 and the second gas electron multiplication foil 110, respectively.

In addition, the radiation detector 100 is equipped with a power supply section 112 for applying voltage to the metal

2 layers 108b, 108c, 110b, 110c and the drift electrode 104, and a detecting unit 114 connected to the collecting electrode 106.

In the above described configuration, a predetermined voltage is applied from the power supply section 112 to the metal layers 108b, 108c, 110b, 110c and the drift electrode 104 in the radiation detector 100 so as to generate an electric field Ed between the drift electrode 104 and the metal layer 108b, an electric field Et between the metal layer 108c and the metal layer 110b, with which the electric fields inside of the through-hole structures 108d and 110d are generated, and an electric field Ei between the metal layer 110c and the collecting electrode 106.

In this situation, the electric field Et is condensed inside the through-hole structures 108d and 110d, and electrons that have entered are accelerated to cause the electron avalanche effects. Then, the collecting electrode 106 detects the electrons multiplied through the electron avalanche effects and the detecting section 114 receives a detection signal to deduce various types of detection data.

Here, in the gas electron multiplier of the above described radiation detector 100, gas electron multiplication foils in two stages having the first gas electron multiplication foil 108 and the second gas electron multiplication foil 110 are used in order to gain a large multiplication factor of electrons due to the electron avalanche effects.

That is to say, a conventional gas electron multiplier has a structure where multiple layers of gas electron multiplication foils are used in stages in order to increase the multiplication factor of electrons.

Meanwhile, photoelectrons released when interaction between radiation and a gas occurs spread approximately several hundreds of μm.

Spread of electrons increases every time the electrons pass through a gas electron multiplication foil, and therefore, position resolution gets worse and precise position information cannot be attained, and consequently, a problem arises where an image obtained in the detecting section becomes blurred.

Detection is possible using Compton scattering or electron pair generation in addition to the photoelectric effects.

Here, the conventional art known by the present applicant at the time of the filing of the patent application is described in the above and does not relate to an invention that has been documented, and therefore, there is no conventional art information to be described.

DISCLOSURE OF THE INVENTION

Problem to be Solved by the Invention

The present invention is provided in view of the above described problems of the prior art, and an object thereof is to provide a gas electron multiplier which enables to reduce the spread of electrons compared with the conventional one without degrading the multiplication factor of electrons, has a large multiplication factor of electrons, and is excellent in positional resolution, and a manufacturing method for a gas electron multiplication foil used for the same as well as a radiation detector using this gas electron multiplier.

Means for Solving Problem

In order to achieve the above described object, the gas electron multiplier and the manufacturing method for a gas electron multiplication foil used for the same as well as the radiation detector using a gas electron multiplier according to the present invention is configured to use a single electron multiplication foil and the thickness of the insulation layer of the electron multiplication foil is made larger than the conventional electron multiplication foils.

In addition, the gas electron multiplier and the manufacturing method for a gas electron multiplication foil used for the same as well as the radiation detector using a gas electron multiplier according to the present invention is configured to use a single electron multiplication foil and the electron multiplication foil is composed of a multilayer body where insulation layer thereof is made in a multilayer structure and metal layers are provided between the respective insulation layers.

With the gas electron multiplier and the manufacturing method for a gas electron multiplication foil used for the same as well as the radiation detector using a gas electron multiplier according to the present invention, spreading of electrons can be reduced compared with the prior art without lowering the multiplication factor of electrons, and a positional resolution can be improved while keeping a large multiplication factor of electrons.

Specifically, the present invention provides a gas electron multiplier using interaction between radiation and gas through photoelectric effects, which includes a chamber filled with gas, and a single gas electron multiplication foil arranged in the chamber, wherein the gas electron multiplication foil is made of a plate-like multilayer body composed of a plate-like insulation layer made of a macromolecular polymer material having a thickness of around 100 μm to 300 μm and flat metal layers overlaid on both surfaces of the insulation layer, and the plate-like multilayer body is provided with a through-hole structure.

In addition, the present invention provides a gas electron multiplier using interaction between radiation and gas through photoelectric effects, which includes a chamber filled with gas, and a single gas electron multiplication foil arranged in the chamber, wherein the gas electron multiplication foil is made of a plate-like multilayer body which is composed of a multilayer body where multiple plate-like insulation layers made of a macromolecular polymer material are stacked with a flat metal layer sandwiched in between and flat metal layers overlaid on both surfaces of the multilayer body, and the plate-like multilayer is provided with a through-hole structure.

In addition, according to the present invention as described above, the total thickness of the multiple insulation layers is around 100 μm to 600 μm.

In addition, the present invention provides a radiation detector utilizing a gas electron multiplier using interaction between radiation and gas through photoelectric effects, wherein the gas electron multiplier is provided according to invention as described above.

In addition, the present invention provides a manufacturing method for a gas electron multiplication foil used in a gas electron multiplier using interaction between radiation and gas through photoelectric effects. At first, flat metal layers are placed on both surfaces of a plate-like insulation layer made of a macromolecular polymer material having a thickness of around 100 μm to 300 μm. The metal layers are etched according to a predetermined hole pattern, and laser beam is irradiated to remove insulator material perpendicularly to the plane of the metal layers to create a through-hole extending in the direction perpendicular to the plane of the metal layers in accordance with the etched pattern of the metal layers. Finally, a desmear process is performed using plasma and chemicals on a surfaces of the metal layers and a wall surface of the through-hole in the insulation layers.

In addition, the present invention provides a manufacturing method for a gas electron multiplication foil used in a gas electron multiplier using interaction between radiation and gas through photoelectric effects. Flat metal layers are placed on both surfaces of a plate-like insulation layer made of a macromolecular polymer material having a thickness of around 50 μm to 300 μm. The metal layers are etched to a predetermined pattern, and a resultant of overlaying a flat metal layer on one surface of a plate-like insulation layer made of a macromolecular polymer material having a thickness of around 50 μm to 300 μm, on one or both surfaces of the metal layers. Outermost metal layers of the resultant are etched in the stacking step in accordance with the predetermined pattern, and all of the insulating films are laser-etched through irradiation with a laser beam applied perpendicularly to the plane of the outermost metal layers in accordance with the predetermined pattern; creating through-holes extending in the direction perpendicular to the plane of the metal layers on the outermost surfaces. Finally, carried out is a desmear process using plasma and a chemical on surfaces of the metal layers and a wall surface of the through-hole in the insulation layers.

Effects of the Invention

According to the present invention, excellent effects can be attained such that a gas electron multiplier, which allows to reduce the spread of electrons as compared with a conventional one without degrading the multiplication factor of electrons, has a large electron multiplication factor and is excellent in the position resolution, and a manufacturing method for a gas electron multiplication foil used for the same as well as a radiation detector using a gas electron multiplier can be provided.

BRIEF DESCRIPTION OF DRAWINGS

FIG. 4(a) is a graph showing the results of the measurements by a radiation detector using the gas electron multiplier according to the first embodiment of the present invention. FIG. 4(b) is a graph showing the results of the measurements by a radiation detector using the gas electron multiplier according to the second embodiment of the present invention. FIG. 4(c) is a graph showing the results of the measurements by a conventional radiation detector.

FIGS. 9(a) to 9(f) are diagrams illustrating steps of a manufacturing method for the gas electron multiplication foil in the gas electron multiplier according to the second embodiment of the present invention.

Figure 1:
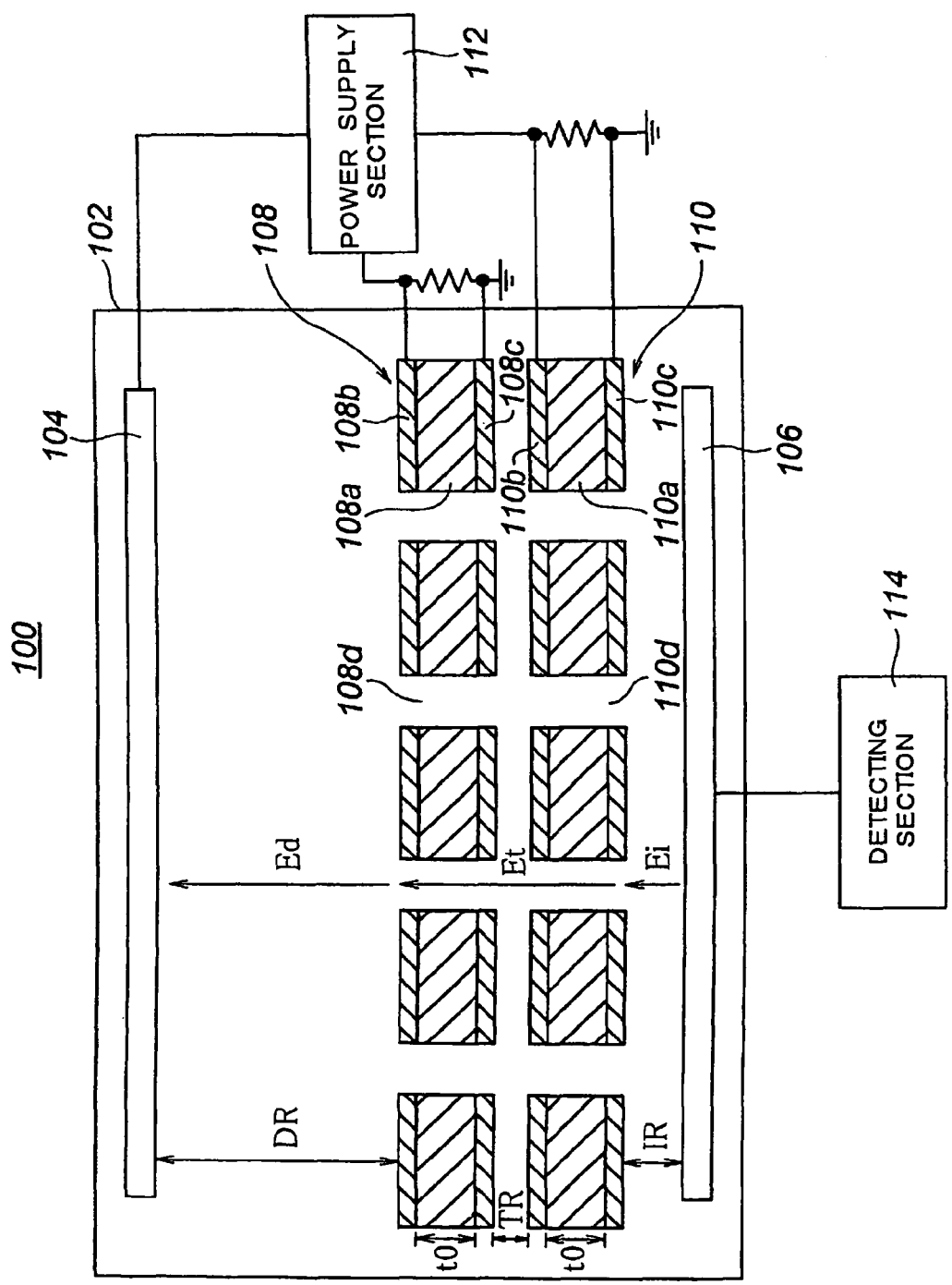
FIG. 1 is a cross sectional diagram schematically showing a configuration of a radiation detector using a conventional gas electron multiplier.

EXPLANATION OF SYMBOLS 10 radiation detector
12 gas electron multiplication foil
12a insulation layer
12b, 12c metal layers
12d through-hole structure
20 radiation detector
22 gas electron multiplication foil
22a-1, 22a-2 insulation layers
22b, 22c, 22e metal layers
22d through-hole structure
100 radiation detector
102 chamber
104 drift electrode
106 collecting electrode
108 first gas electron multiplication foil
108a insulation layer
108b, 108c metal layers
108d through-hole structure
110 second gas electron multiplication foil
110a insulation layer
110b, 110c metal layers
110d through-hole structure
112 power supply section
114 detecting section
200 two-dimensional image detector
202 thin film transistor
300 photodetector
302 photoelectric layer
400 photodetector
402 photoelectric layer
500 resist layer

BEST MODE FOR CARRYING OUT THE INVENTION

In the following, a gas electron multiplier and a manufacturing method for a gas electron multiplication foil used for the same as well as a radiation detector using a gas electron multiplier according to an embodiment of the present invention are described in detail in reference to the accompanying drawings.

Here, in the following description, the same reference numerals are designated to components having the same or equivalent configurations as those described before in reference to a figure, such as FIG. 1, and the detailed description of the configurations and working effects will not be repeated.

Figure 2:
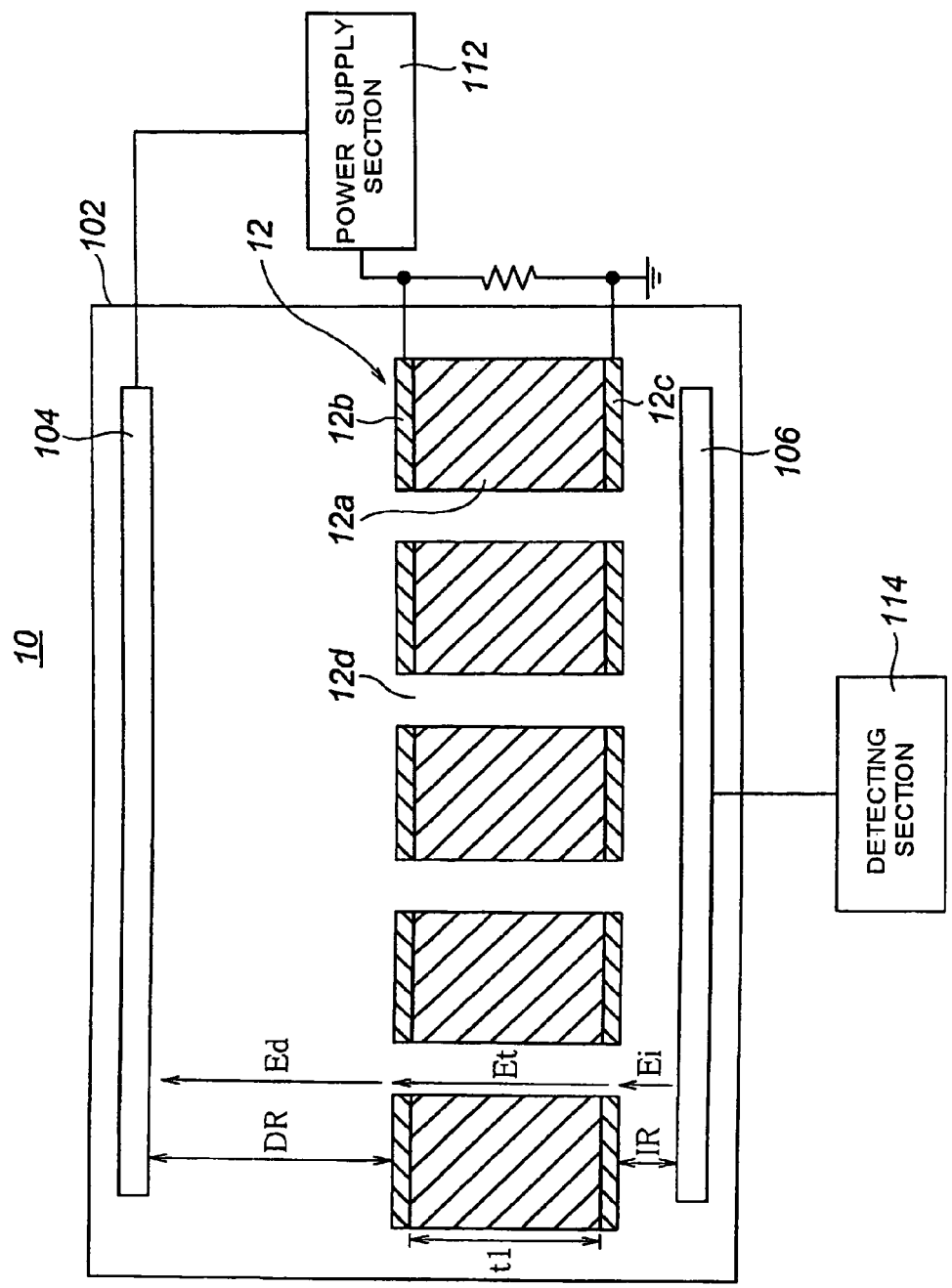
FIG. 2 is a cross sectional diagram schematically showing a configuration of a radiation detector using a gas electron multiplier according to a first embodiment of the present invention.

FIG. 2 is a cross sectional diagram schematically showing a configuration of a radiation detector using a gas electron multiplier according to a first embodiment of the present invention.

This radiation detector 10 is different from the conventional radiation detector 100 in that the gas electron multiplier is composed by having a chamber 102 filled with a predetermined gas for detection and a single gas electron multiplication foil 12.

Here, the gas electron multiplication foil 12 is composed by having a plate-like insulation layer 12a made of resin, and flat metal layers 12b and 12c overlaid on both surfaces of the insulation layer 12a. In addition, multiple through-hole structures 12d which extend in a direction perpendicular to the plane of the metal layers 12b and 12c are formed in the gas electron multiplication foil 12 as through-hole structures for condensing an electric field.

In addition, the thickness t1 of the insulation layer 12a is greater than t0 of the insulation layer of the conventional gas electron multiplication foil, and is set to 100 μm, for example. The thickness of the insulation layer 12a may be set to an appropriate value in a range from approximately 100 μm to 300 μm.

Here, in the case where the thickness t1 of the insulation layer 12a is 100 μm, a voltage of approximately 700 V to 1000 V can be applied across the metal layers 12b and 12c from the power supply section 112.

As the material for the insulation layer 12a, a macromolecular polymer material, such as polyimide or a liquid crystal polymer, can be used.

Meanwhile, as the material for the metal layers 12b and 12c, which function as electrodes for generating an electric field inside the through-hole structures 12d, copper, aluminum, gold or boron, for example, can be used. Here, in order to form the metal layers 12b and 12c on the insulation layer 12a, such a technique as lamination, sputtering vapor deposition or plating may be used, and the thickness of the metal layers 12b and 12c is set to approximately 5 μm, for example.

In the radiation detector 10 according to the above described configuration, a predetermined voltage is applied to the metal layers 12b and 12c and the drift electrode 104 from the power supply section 112, and then an electric field Ed is generated between the drift electrode 104 and the metal layer 12b, an electric field Et is generated inside the through-hole structures 12d, and an electric field Ei is generated between the metal layer 12c and the collecting electrode 106.

The electric field Et is condensed inside the through-hole structures 12d so that electrons that have entered are accelerated to cause the electron avalanche effects. Then, the collecting electrode 106 detects the electrons multiplied through the electron avalanche effects and the detecting section 114 receives a detection signal to deduce various types of detection data.

The radiation detector 10 has a single gas electron multiplication foil 12 only, and therefore, the spreading of electrons can be reduced as compared with the case using the multiple conventional gas electron multiplication foils.

In addition, the thickness t1 of the insulation layer 12a is larger than the thickness t0 of the insulation layer of conventional gas electron multiplication foils, and therefore, the value of the voltage applied to the metal layers 12b and 12c and the drift electrode 104 from the power supply section 112 can be set higher than the value of the voltage applied to the gas electron multiplication foils and the drift electrode in case of conventional radiation detectors, and therefore, the multiplication factor of electrons is not degraded, as compared with a conventional one.

Figure 3:
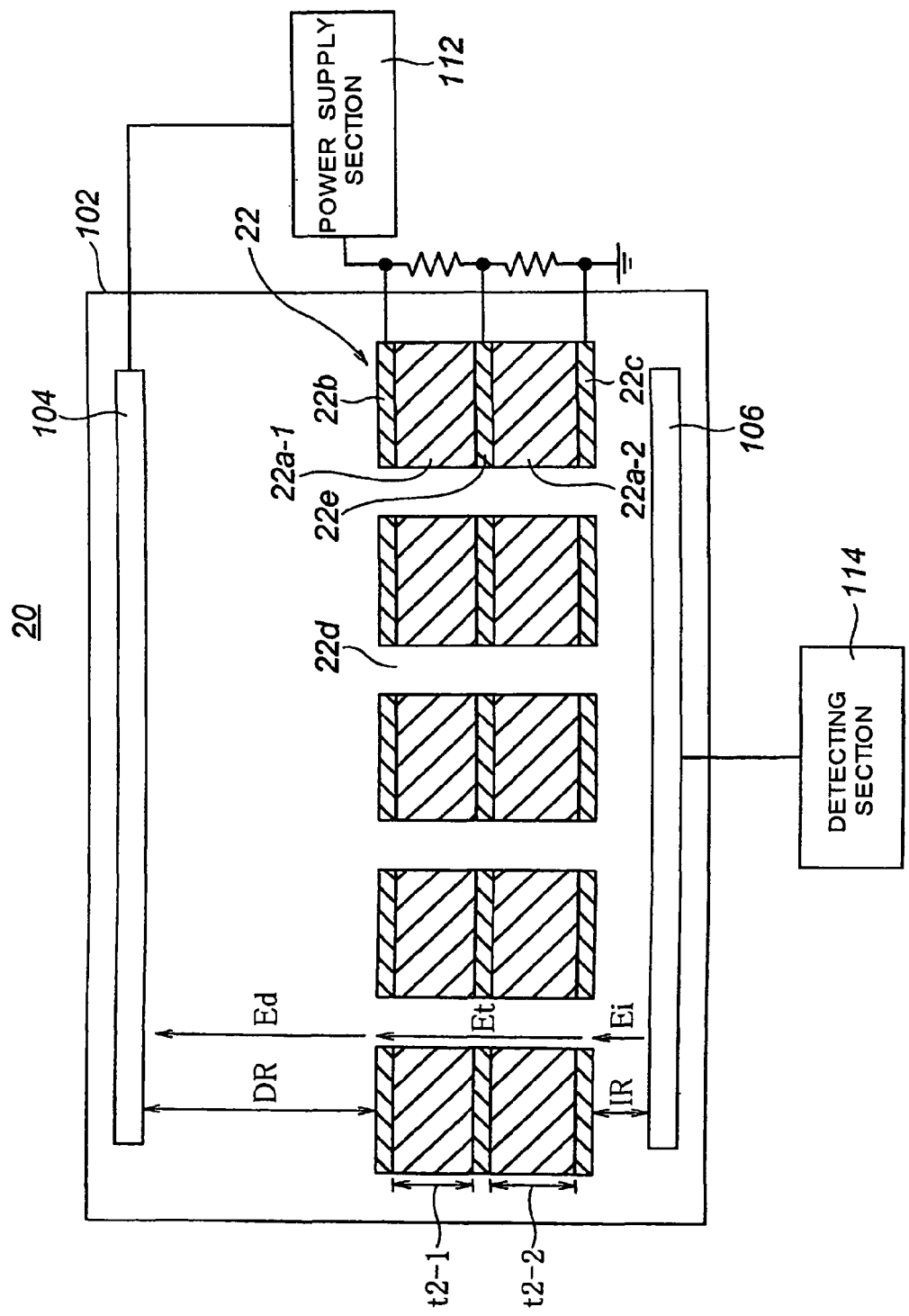
FIG. 3 is a cross sectional diagram schematically showing a configuration of a radiation detector using a gas electron multiplier according to a second embodiment of the present invention.

Next, FIG. 3 is a cross sectional diagram schematically showing a configuration of a radiation detector using a gas electron multiplier according to the second embodiment of the present invention.

This radiation detector 20 is different from the conventional radiation detector 100 in that the gas electron multiplier is composed of a chamber 102 filled with a predetermined gas for detection and a single gas electron multiplication foil 22.

Here, the gas electron multiplication foil 22 includes a multilayer structure composed of a multilayer body where multiple plate-like insulation layers made of resin and metal layers are alternately layered.

In further detail, the gas electron multiplication foil 22 includes a plate-like insulation layer 22a-1 made of resin and a plate-like insulation layer 22a-2 made of resin, and a flat metal layer 22e between the insulation layer 22a-1 and the insulation layer 22a-2. Furthermore, a flat metal layer 22b is formed on an opposite side of the insulation layer 22a-1 to the surface where the metal layer 22e is formed, while a flat metal layer 22c is formed on an opposite surface of the insulation layer 22a-2 from the one where the metal layer 22e is formed. In addition, multiple through-hole structures 22d for condensing an electrical field are formed in the gas electron multiplication foil 22.

The sum of the thickness t2-1 of the insulation layer 22a-1 and the thickness t2-2 of the insulation layer 22a-2 is greater than the thickness t0 of the insulation layers in conventional gas electron multiplication foils, and is set to 100 µm, for example. The thickness t2-1 of the insulation layer 22a-1 and the thickness t2-2 of the insulation layer 22a-2 may be set to appropriate values in a range from approximately 50 µm to 300 µm, for example. The sum of the thickness t2-1 of the insulation layer 22a-1 and the thickness t2-2 of the insulation layer 22a-2 may be set to an appropriate value in a range from approximately 100 µm to 600 µm, for example.

Here, in this embodiment, the thickness t2-1 of the insulation layer 22a-1 and the thickness t2-2 of the insulation layer 22a-2 are both 50 µm, so that the sum of the thickness t2-1 of the insulation layer 22a-1 and the thickness t2-2 of the insulation layer 22a-2 is 100 µm.

In the case where the thicknesses t2-1 and t2-2 of the insulation layer 22a-1 and 22a-2 are 50 µm, a voltage of approximately 350 V to 500 V can be applied across the metal layers 22b and 22e, as well as across the metal layers 22e and 22c, from the power supply section 112, while in the case where the thicknesses t2-1 and t2-2 of the insulation layer 22a-1 and 22a-2 are 100 µm, a voltage of approximately 700 V to 1000 V can be applied across the metal layers 22b and 22e, as well as across the metal layers 22e and 22c, from the power supply section 112.

As the material for the insulation layers 22a-1 and 22a-2, a macromolecular polymer material, such as polyimide or a liquid crystal polymer, for example, can be used.

Meanwhile, as the material for the metal layers 22b, 22c and 22e which function as electrodes for generating an electric field inside the through-hole structures 22d, copper, aluminum, gold or boron, for example, can be used. Here, in order to form the metal layers 22b, 22c and 22e on the insulation layers 22a-1 and 22a-2, such a technique as lamination, sputtering vapor deposition or plating may be used, and the thickness of the metal layers 22b, 22c and 22e is set to approximately 5 µm, for example.

In the radiation detector 20 according to the above described configuration, a predetermined voltage is applied to the metal layers 22b, 22c and 22e and the drift electrode 104 from the power supply section 112 and then an electric field Ed is generated between the drift electrode 104 and the metal layer 22b, an electric field Et is generated inside the through-hole structures 22d, and an electric field Ei is generated between the metal layer 22c and the collecting electrode 106.

The electric field Et is condensed inside the through-hole structures 22d so that electrons that have entered are accelerated to cause the electron avalanche effects. Then, the collecting electrode 106 detects the electrons multiplied through the electron avalanche effects and the detecting section 14 receives the detection signal to deduce various types of detection data.

The radiation detector 20 has a single gas electron multiplication foil 22 only, and therefore, the spreading of electrons can be reduced compared with the case using the multiple conventional gas electron multiplication foils.

In addition, sum of the thickness t2-1 of the insulation layer 22a-1 and the thickness t2-2 of the insulation layer 22a-2 is greater than the thickness t0 of the insulation layer of conventional gas electron multiplication foils, and therefore, the value of the voltage applied to the metal layers 22b, 22c and 22e and the drift electrode 104 from the power supply section 112 can be set higher than the value of the voltage applied to the gas electron multiplication foils and the drift electrode by conventional radiation detectors, and therefore, the multiplication factor of electrons is not degraded, as compared with a conventional one.

Furthermore, in the radiation detector 20, the electrical field Et generated between the metal layer 22b and the metal layer 22c is rectified by applying a voltage to the metal layer 22e, thereby causing electron avalanche effects efficiently.

Next, the results of experiments by the present inventors using the above described conventional radiation detector 100, the radiation detector 10 using a gas electron multiplier according to the first embodiment of the present invention and the radiation detector 20 using a gas electron multiplier according to the second embodiment of the present invention are described.

Here, in the radiation detector 100 used in the experiments, polyimide having a thickness t0 of 50 µm was used as the insulation layers 108a and 110a, copper having a thickness of 5 µm was used as the metal layers 108b, 108c, 110b and 110c, and a voltage of 350 V to 450 V was applied across the metal layers 108b and 108c, as well as across the metal layers 110b and 110c from the power supply section 112.

In case of the radiation detector 10 used in the experiments, liquid crystal polymer having a thickness t1 of 100 µm was used as the insulation layer 12a, copper having a thickness of 5 µm was used as the metal layers 12b and 12c, and a voltage of 700 V was applied across the metal layers 12b and 12c from the power supply section 112.

Furthermore, in the radiation detector 20 used in the experiments, liquid crystal polymer having a thickness t2-1 and t2-2 of 50 µm was used as the insulation layers 22a-1 and 22a-2, copper having a thickness of 5 µm was used as the metal layers 22b, 22c and 22e, and a voltage of 700 V was applied across the metal layers 22b and 22c from the power supply section 112.

Here, in the experiments, a pixel detector for reading a charge was used as the detecting section 114. In addition, the drift region DR was 5.5 mm and the induction region IR was 2.7 mm in all of the radiation detectors 10, 20 and 100. The distance TR between the first gas electron multiplication foil 108 and the second gas electron multiplication foil 110 in the radiation detector 100 was 2.0 mm.

As for a measuring method, the spread of signals (electrons) was determined by measuring the spread of the reaction points of X-rays (5.9 keV) from a $^{55}$Fe radiation source.

Figures 4A, 4B, 4C:
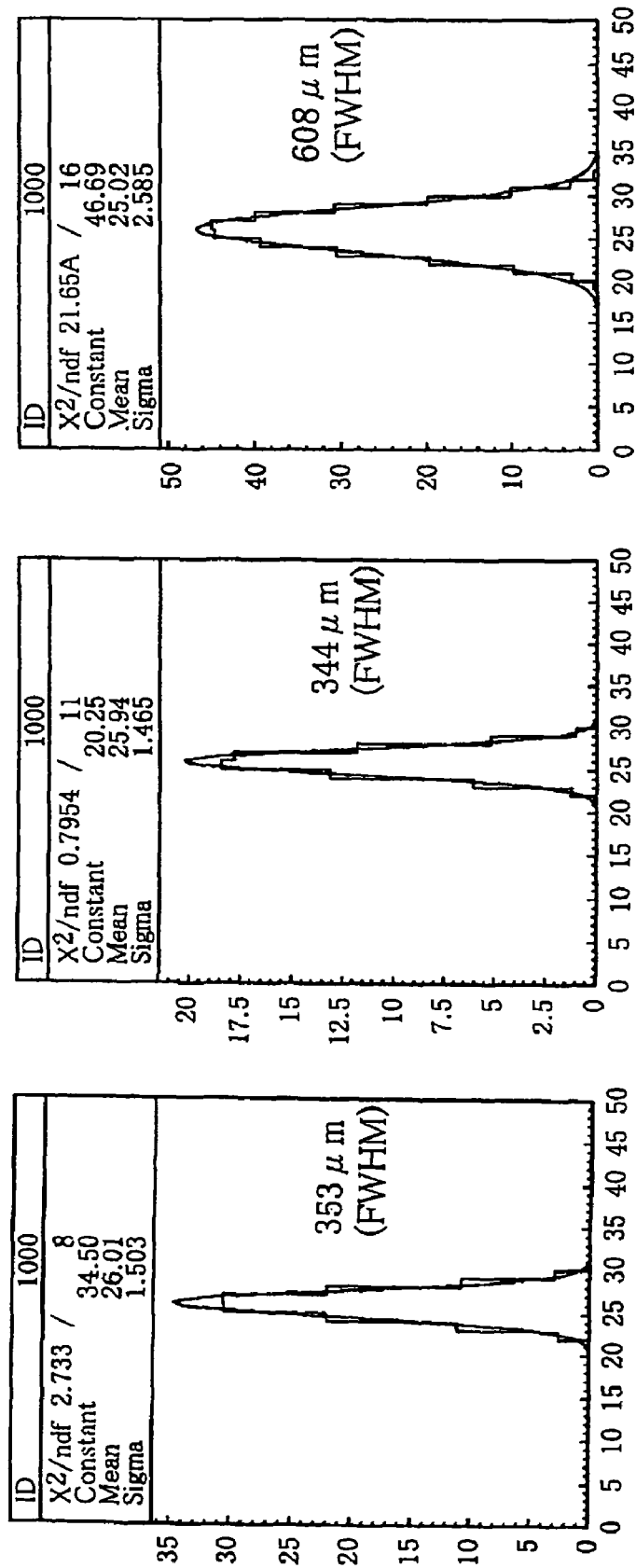
FIGS. 4(a) to 4(c) are graphs showing the results of the experiments by the present inventors.

FIG. 4(a) is a graph showing the results of measurement by the radiation detector 10, FIG. 4(b) is a graph showing the results of measurement by the radiation detector 20, and FIG. 4(c) is a graph showing the results of measurement by the radiation detector 100. Here, in the graphs shown in FIGS. 4(a), 4(b) and 4(c), the longitudinal axis indicates the number of counts N [count] and the lateral axis indicates the spread of signals [10 µm].

From the graphs in FIGS. 4(a), 4(b) and 4(c), it can be seen that the measured value for the spread of signals in the radiation detector 10 was 353 μm (FWHM), the measured value for the spread of signals in the radiation detector 20 was 344 μm (FWHM), and the measured value for the spread of signals in the radiation detector 100 was 608 μm (FWHM).

Thus, the spread of electrons was smaller in the radiation detectors 10 and 20 than in the radiation detector 100.

Figure 5:
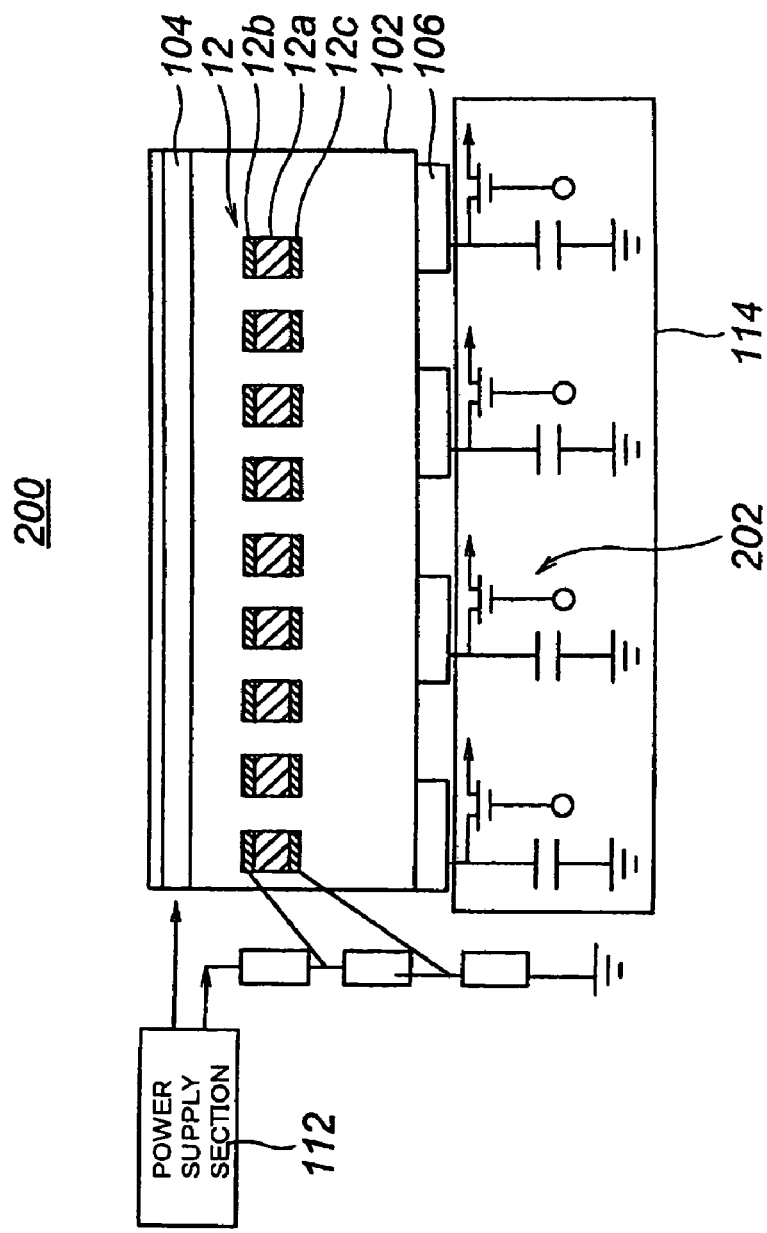
FIG. 5 is a cross sectional diagram showing an example of the configuration of a two-dimensional image detector of x-rays using the gas electron multiplier according to the first embodiment of the present invention.

Next, FIG. 5 is a cross sectional diagram showing an example of the configuration of a two-dimensional image detector of X-rays using the gas electron multiplier according to the first embodiment of the present invention.

In this two-dimensional image detector 200, a mixed gas where 30% of carbon dioxide ($CO_2$) is mixed with argon (Ar) is filled in a chamber 102 as a gas for detection. In the chamber 102, a single gas electron multiplication foil 12 is placed between a drift electrode 104 and a collecting electrode 106 and a predetermined voltage is applied across the drift electrode 104 and the metal layers 12b and 12c of the gas electron multiplication foil 12 from the power supply section 112.

In addition, the detecting section 114 is provided with a thin film transistor 202 for each pixel and configured to output a detection signal for each pixel.

With the two-dimensional image detector 200 as such configured, X-rays entered into the chamber 102 act on the gas for detection to generate electrons. These electrons are accelerated by the gas electron multiplying foil 12, so that the electrons are multiplied to approximately 100 times to 100,000 times as a result of electron avalanche effects, and are detected by the detecting section 114.

Accordingly, when the two-dimensional image detector 200 is used, X-rays can be detected with high efficiency and a clear image can be attained.

Such two-dimensional image detector 200 can be applied to medical X-ray machines, CT machines and detectors mounted in dosage monitors, for example.

Figure 6:
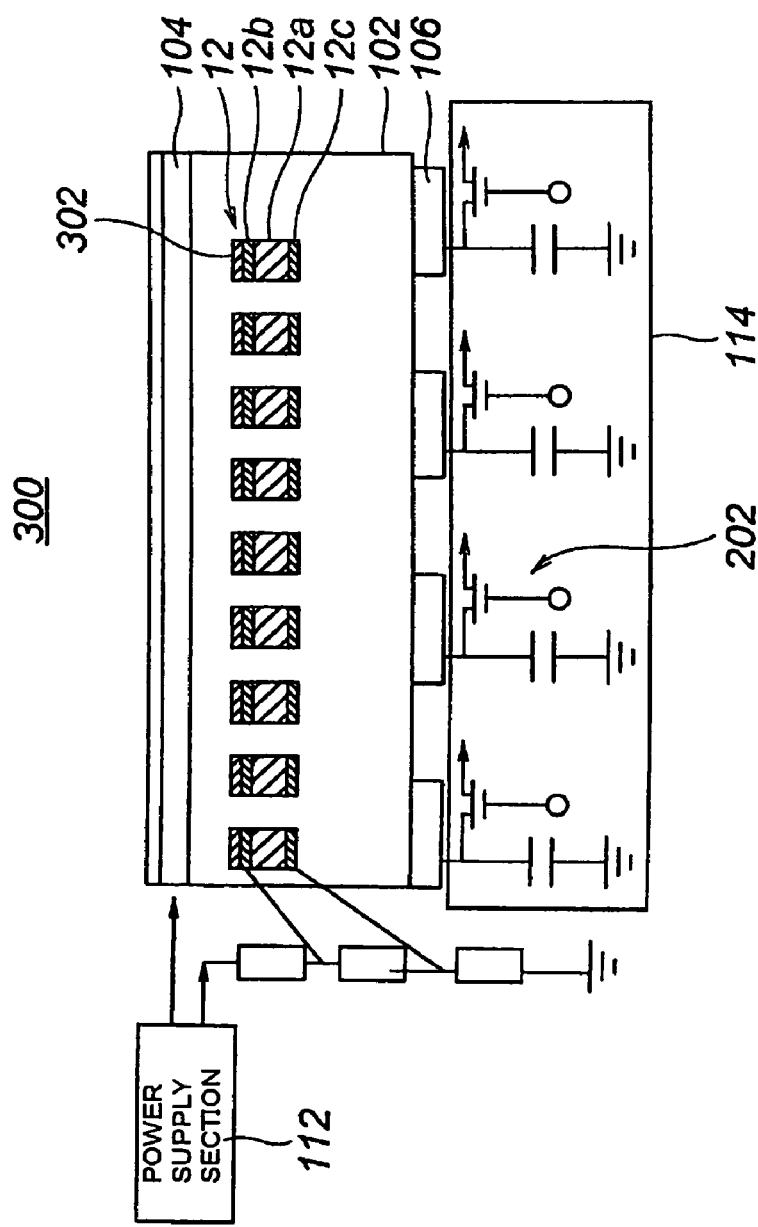
FIG. 6 is a cross sectional diagram showing an example of the configuration of a photodetector which uses the gas electron multiplier according to the first embodiment of the present invention.
Figure 7:
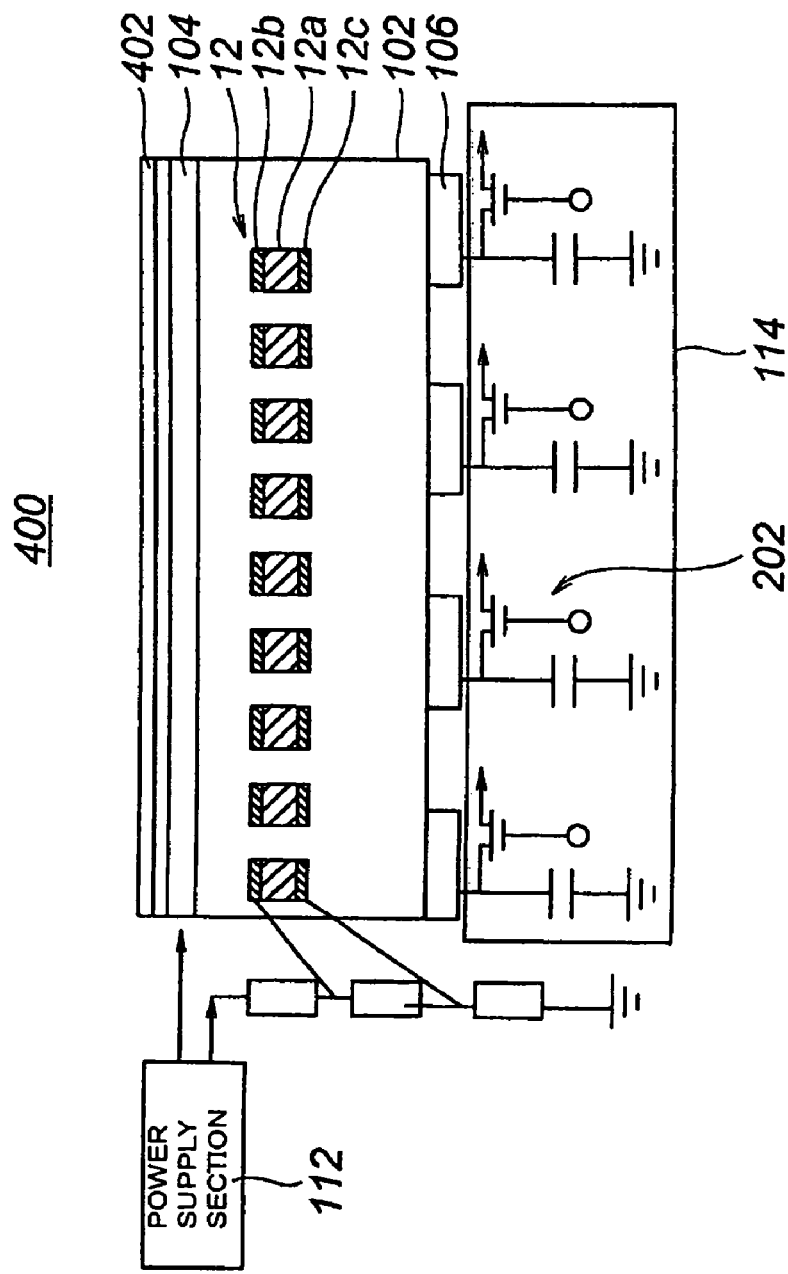
FIG. 7 is a cross sectional diagram showing another example of the configuration of a photodetector which uses the gas electron multiplier according to the first embodiment of the present invention.

Next, FIGS. 6 and 7 are cross sectional diagrams showing different examples of the configuration of a photodetector using the gas electron multiplier according to the first embodiment of the present invention.

Here, the photodetector 300 shown in FIG. 6 is different from the two-dimensional image detector 200 shown in FIG. 5 in that a photoelectric layer 302 is formed on the metal layer 12b of the gas electron multiplication foil 12.

With the photodetector 300 as such configured, when light such as ultraviolet rays or visible light enters into the chamber 102, photoelectrons are generated by the photoelectrical layer 302 then electrons are multiplied in the electrical fields inside the through-hole structures 12d formed in the gas electron multiplication foil 12. The multiplied electrons are detected by the detecting section 114, as in the two-dimensional image detector 200 shown in FIG. 5.

In addition, the photodetector 400 shown in FIG. 7 is different from the two-dimensional image detector 200 shown in FIG. 5 in that a photoelectric layer 402 is formed on the inner surface of the entrance window.

With the photodetector 400 as such configured, when light such as ultraviolet light or visible light enters into the chamber 102, photoelectrons are generated by the photoelectrical layer 402 and after that, electrons multiplied according to the same procedure as in the photodetector 300 are detected by the detecting section 114.

Next, with reference to FIGS. 8(a) to 8(d), the manufacturing method for a gas electron multiplication foil 12 in a gas electron amplifier according to the first embodiment of the present invention is described.

Figure 8A:
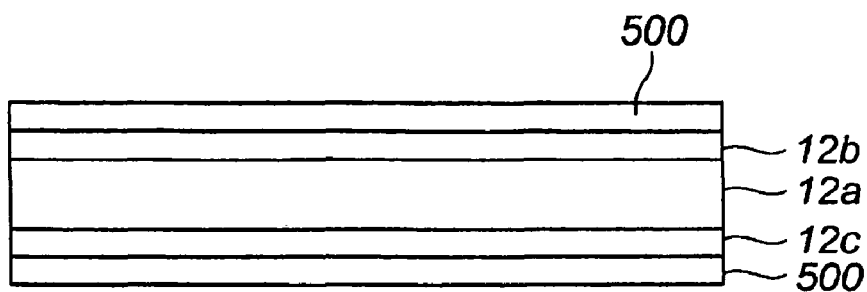
FIGS. 8(a) to 8(d) are diagrams illustrating steps of a manufacturing method for the gas electron multiplication foil in the gas electron multiplier according to the first embodiment of the present invention.

That is to say, in order to manufacture the gas electron multiplication foil 12, at first flat metal layers 12b and 12c are overlaid on both surfaces of the plate-like insulation layer 12a made of a liquid crystal polymer having a thickness of 100 μm, for example, and after a pre-process carried out on the surfaces of the metal layers 12b and 12c, a resist layer 500 is formed (see FIG. 8(a)). Here, for example, copper can be used for the metal layers 12b and 12c, and a dry film resist (AQ2558, made by Asahi Kasei Corporation) for the resist layer 500.

Figure 8B:
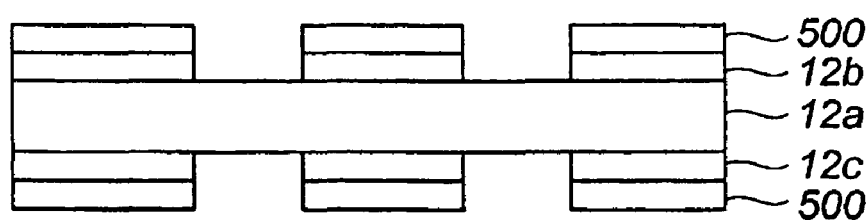

Then, the resist layer 500 is patterned to have aligned with the locations of the through-hole structures 12d, and then openings are created in the metal layers 12b and 12c in accordance with the above described patterning (see FIG. 8(b)). The patterning described above can be carried out by vacuum contact exposure with an exposure dose of 60 mJ/cm$^2$ using a mask for exposure having a predetermined pattern, and then developing using a solution of 1% sodium carbonate. The openings can be created in the metal layers 12b and 12c through etching using a solution of ferric chloride, for example, in the case where the metal layers 12b and 12c are made of copper.

Figure 8C:
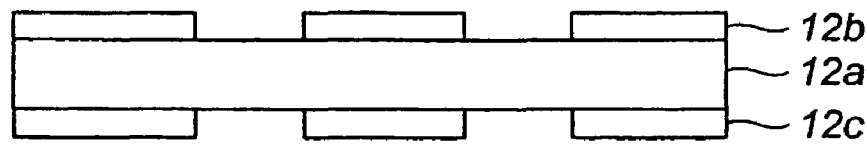
Figure 8D:
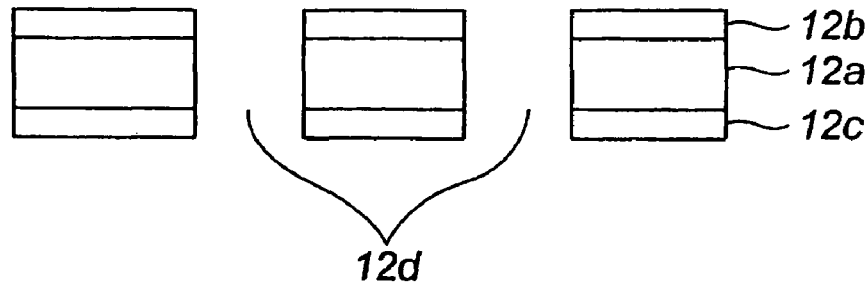

Next, the resist layer 500 is removed using a solution of 3% sodium hydroxide, for example (see FIG. 8(c)), and the portion of the insulation layer 12a is removed by irradiating a laser beam such as a $CO_2$ laser, thus through-holes are created to form through-hole structures 12d (see FIG. 8(d)).

When portions of the insulation layer 12a are removed using a laser beam to create through-holes, the laser beam is directed so that the walls of the through-hole structures 12d become perpendicular to the plane of the metal layers 12b and 12c.

Here, it is preferable to make smooth the surface of the walls of the through-hole structures 12d formed in the step shown in FIG. 8(d) in the surface finishing step. This can prevent the walls of the through-hole structures 12d from charge deposition during the operation of the gas electron multiplier.

In the surface finishing step, plasma etching is carried out for three minutes each on the front surface and rear surface under the conditions where the gas ratio is $SF_6$:0.05, $N_2$:0.10, $O_2$:1.0 and the RF output is 2.1 kW, so that a soot-like substance attached on the walls of the through-hole structures 12d is removed through irradiation of the above described laser beam.

Next, the surface of the walls of the through-hole structures 12d is processed with a permanganate-based solution or a solution of sodium hydroxide, so that the smoothness on the surface increases. This makes the roughness of the surface of the walls of the through-hole structures 12d to be 4 μm or less. This surface processing using a permanganate-based solution or a solution of sodium hydroxide can be carried out as a hole cleaning process with Emplate MLB made by Meltex Inc., for example.

By carrying out the above described desmear process, the roughness of the surface of the inner walls of the through-hole structures 12d can be made 4 μm or less. In addition, even if protrusions are created on the inner walls of the through-hole structures 12d, their height can be 15% or less of the thickness of the insulation layer 12a.

Next, with reference to FIGS. 9(a) to 9(f), the manufacturing method for a gas electron multiplication foil 22 in a gas electron amplifier according to the second embodiment of the present invention is described.

That is to say, in order to manufacture the gas electron multiplication foil 22, at first flat metal layers 22b and 22e are overlaid on both surfaces of the plate-like insulation layer 22a-1 made of a liquid crystal polymer having a thickness of 50 μm, for example, and after a pre-process is carried out on the surfaces of metal layers 22b and 22e, a resist layer 500 is formed (see FIG. 9(a)). Here, copper can be the metal layers 22b and 22e, and a dry film resist (AQ2558, made by Asahi Kasei Corporation) for the resist layer 500, for example.

Then, the resist layer 500 is patterned on the surface of the metal layer 22e so as to align with the location of the through-hole structures 22d, and marks are created on the metal layers 22b and 22e for the align exposure after overlay, and then openings are created in the metal layers 22b and 22e in accordance with the above described pattern (see FIG. 9(b)). The above described patterning can be carried out by vacuum contact exposure with an exposure dose of 60 mJ/cm$^2$ using a mask for exposure having a predetermined pattern, and then developing using a solution of 1% sodium carbonate. The openings can be created in the metal layers 22b and 22e through etching using a solution of ferric chloride, for example, in the case where the metal layers 22b and 22e are made of copper.

Next, the resist layer 500 is removed using a solution of 3% sodium hydroxide, for example, and a two-layer material where a flat metal layer 22c is overlaid on one side of the plate-like insulation layer 22a-2 made of a liquid crystal polymer having a thickness of 50 μm is adhered through thermal pressing under a high temperature in a vacuum (see FIGS. 9(c) and 9(d)). Here, technique for stacking is not limited to thermal pressing, and an appropriate adhesive or the like may be used.

Then, the resist layer 500 is patterned again to align with the location of the through-hole structures 22d, and then openings are created in the metal layers 22b and 22c in accordance with the above described pattern (see FIG. 9(d)). The above described patterning can be carried out by vacuum contact exposure with an exposure dose of 60 mJ/cm$^2$ using a mask for exposure having a predetermined pattern, and then developing using a solution of 1% sodium carbonate. The openings can be created in the metal layers 22b and 22c through etching using a solution of ferric chloride, for example, in the case where the metal layers 22b and 22d are made of copper.

Next, the resist layer 500 is removed using a solution of 3% sodium hydroxide, for example, and the portion of the insulation layers 22a-1 and 22a-2 is removed by irradiating a laser beam such as a $CO_2$ laser, to form through-hole structures 22d (see FIG. 9(f)).

When portions of the insulation layers 22a-1 and 22a-2 are removed using a laser beam to create through-holes, the laser beam is directed so that the walls of the through-hole structures 22d become perpendicular to the plane of the metal layers 22b, 22e and 22c.

Here, it is preferable to make smooth the surface of the walls of the through-hole structures 22d formed in the step shown in FIG. 9(f) in the surface finishing step. This can prevent the walls of the through-hole structures 22d from charging up during the operation of the gas electron multiplier.

In the surface finishing step, plasma etching is carried out for three minutes each on the front surface and rear surface under conditions where the gas ratio is $SF_6$:0.05, $N_2$:0.10, $O_2$:1.0 and the RF output is 2.1 kW, so that a soot-like substance attached on the walls of the through-hole structures 22d is removed through irradiation with the above described laser beam.

Next, the surface of the walls of the through-hole structures 22d is processed with a permanganate-based solution or a solution of sodium hydroxide, so that the smoothness of the surface increases. This allows the roughness of the surface of the walls of the through-hole structures 22d to be 4 μm or less. This surface processing using a permanganate-based solution or a solution of sodium hydroxide can be carried out as a hole cleaning process with Emplate MLB made by Meltex Inc., for example.

By carrying out the above described desmear process, the roughness of the surface of the inner walls of the through-hole structures 22d can be made 4 μm or less. In addition, even if protrusions are created on the inner walls of the through-hole structures 22d, their height can be 15% or less of the thickness of the insulation layers 22a-1 and 22a-2.

Here, the above described embodiments can be modified as described in the following (1) to (3).

(1) Though in the above described second embodiment, two insulation layers: insulation layer 22a-1 and insulation layer 22a-2, are provided with a metal layer 22e sandwiched in between, it is apparent that the present invention is not limited to this configuration, and three or more insulation layers may be provided in such a manner that metal layers and insulation layers are alternately stacked.

(2) Though in the above described second embodiment, the thickness of the insulation layer 22a-1 and that of the insulation layer 22a-2 are the same, it is apparent that the present invention is not limited to this configuration, and the two layers may have a different thickness, as long as the total thickness of the insulation layers is greater than the thickness of the insulation layer of the conventional gas electron multiplication foil.

(3) The above described embodiments and the modifications described in the above (1) and (2) may be used in appropriate combinations.

INDUSTRIAL APPLICABILITY

The present invention can be applied in order to reduce the amount of radiation in the field of medical image diagnosis, in order to detect the radiation from space, and in the field of biochemistry, and more specifically, in x-ray dosage monitors, medical x-ray machines (mammography, general x-ray machines), industrial non-destructive inspection machines, charged particle track detectors, space x-ray detectors, photodetection imagers, slow neutron detectors and the like.

The invention claimed is:
1. A gas electron multiplier using interaction between radiation and gas through photoelectric effects, comprising:
   a chamber filled with gas; and
   a single gas electron multiplication foil arranged in the said chamber, wherein
   the said gas electron multiplication foil is made of a plate-like multilayer body which is composed of a multilayer body where multiple plate-like insulation layers made of a macromolecular polymer material are stacked with a flat metal layer sandwiched in between and flat metal layers overlaid on both surfaces of said multilayer body,
   the flat metal layer having a thickness of approximately 5 μm sandwiched in between said multiple plate-like insulation layers and the flat metal layers overlaid on both surfaces of said multilayer body each have a thickness of approximately 5 μm and
   the said plate-like multilayer is provided with a through-hole structure, said through-hole structure extending in the direction perpendicular to a plane of the flat metal layer sandwiched in between said multiple plate-like insulation layers and the flat metal layers overlaid on both surfaces of said multilayer body.

2. The gas electron multiplier according to claim 1, wherein
the total thickness of the said multiple insulation layers is 100 μm to 600 μm.

3. A radiation detector utilizing a gas electron multiplier using interaction between radiation and gas through photoelectric effects, wherein the said gas electron multiplier is the gas electron multiplier according to claim 2.

4. A radiation detector utilizing a gas electron multiplier using interaction between radiation and gas through photoelectric effects, wherein
the said gas electron multiplier is the gas electron multiplier according to claim 1.

5. The gas electron multiplier according to claim 1, the through-hole structure having a width, the entire width of the through-hole structure having a substantially constant length.

6. A manufacturing method for a gas electron multiplication foil used in a gas electron multiplier using interaction between radiation and gas through photoelectric effects, comprising:
overlaying flat metal layers on both surfaces of a plate-like insulation layer made of a macromolecular polymer material having a thickness of 50 μm to 300 μm;
etching the said metal layers to a predetermined pattern;
stacking a resultant of overlaying a flat metal layer on one surface of a plate-like insulation layer, which is made of a macromolecular polymer material having a thickness of 50 μm to 300 μm, on one or both surfaces of the said metal layers;
etching outermost metal layers of the resultant obtained in the stacking step in accordance with the said predetermined pattern;
removing all of the said insulating films through irradiation with a laser beam applied perpendicularly to the plane of said outermost metal layers in accordance with the said predetermined pattern;
creating a through-hole extending in the direction perpendicular to the plane of the metal layers on the said outermost surfaces; and
carrying out a desmear process using plasma and a chemical on surfaces of the said metal layers and a wall surface of the through-hole in the said insulation layers, wherein said metal layers have a thickness of approximately 5 μm.

* * * * *